Figure 1:
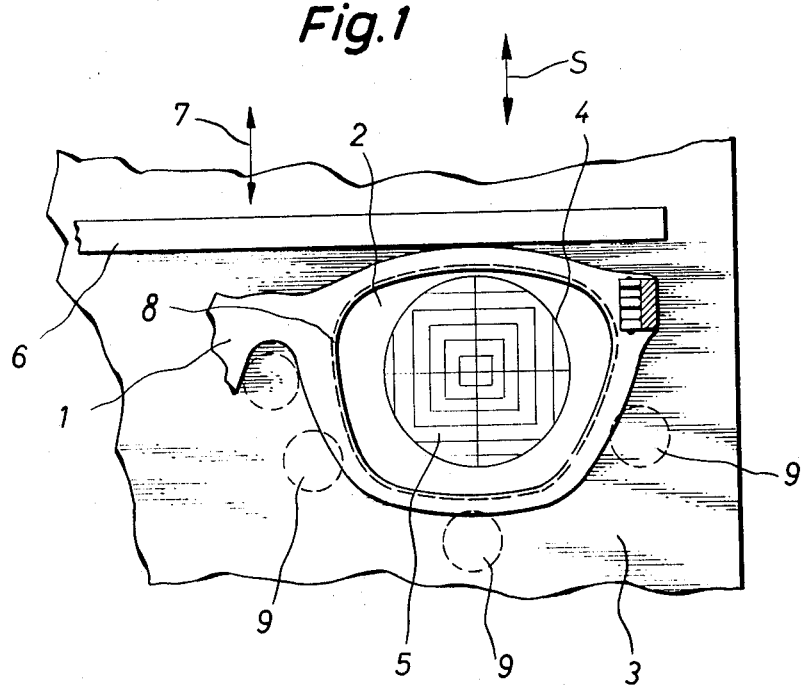

United States Patent

[11] 3,624,799

[72] Inventor Thomas Sotonyi
Wuppertal-Barmen, Germany
[21] Appl. No. 865,083
[22] Filed Oct. 9, 1969
[45] Patented Nov. 30, 1971
[73] Assignee Firma Wernicke & Co.
Dusseldorf-Eller, Germany
[32] Priority Oct. 29, 1968
[33] Germany
[31] P 18 05 760.8

[54] DEVICE FOR THE DETACHABLE FASTENING OF THE GLASS MOUNT OF GLASS FRAMES ON A WORKTABLE
5 Claims, 5 Drawing Figs.
[52] U.S. Cl. .................................................. 248/361 R, 248/206 A, 269/8
[51] Int. Cl. .................................................. B62b35/00, B25b 29/00
[50] Field of Search .......................................... 248/361, 361 A, 205 A; 269/8, 91, 231; 85/28; 292/241, 251.5; 211/DIG. 1

[56] References Cited
UNITED STATES PATENTS
| | | | |
|---|---|---|---|
| 2,704,235 | 3/1955 | Bion | 108/6 |
| 229,467 | 6/1880 | Remhof | 248/346.1 |
| 1,276,932 | 8/1918 | King | 292/241 |
| 1,876,115 | 9/1932 | Way | 292/241 X |
| 2,731,663 | 1/1956 | Thompson | 16/114 |
| 2,712,191 | 4/1955 | Hillenbrand | 248/206 X |
| 2,379,136 | 6/1945 | Erwin | 269/8 |
| 2,965,235 | 12/1960 | Daline | 248/206 X |
| 3,226,888 | 1/1966 | Erenyl | 269/8 X |

Primary Examiner—Chancellor E. Harris
Attorneys—James M. Heilman and Heilman and Heilman ABSTRACT: The invention relates to a device for the detachable fastening of the glass mount of frames for glasses on a worktable, etc., for example, an apparatus for the production of templets according to the glass or lens mount.

INVENTOR.
THOMAS SOTONYI

DEVICE FOR THE DETACHABLE FASTENING OF THE GLASS MOUNT OF GLASS FRAMES ON A WORKTABLE

The invention relates to a device for the detachable fastening of the glass mount of frames for glasses on a worktable, etc., for example, an apparatus for the production of templets according to the glass or lens mount. With regard to the nomenclature of the terms it should be pointed out that glass mount according to the attached drawings is only the part which has the two holes or openings for receiving the lenses and which is to be clamped in the present case. The sides which hold the mount on the head of the user and which extend behind the ears form together with the glass mount the glass frame or spectacle frame.

For the production of templets according to the glass mount it is necessary to set the glass mount of the glass frame on the worktable of the apparatus for the production of the templet, that is, to center or not to center it with respect to a given removable marking and to keep it in this position.

For retaining the glass mount on the worktable after the adjustment of the glass mount with respect to the marking it is known to use a fitting bar or fitting edge which is preferable itself adjustable in one direction. The glass mount is placed with one edge flat on the table against this bar or edge and then locked in this position by means of springs, etc. It is frequently possible, however, during and particularly after the release of the mount that it is displaced by the spring force and thus loses its selected position. That is due substantially to the fact that the springs are set for certain glass mounts so that deviations of the glass mount require either a great variation of the springs and their application, which is expensive and costly, or adjustable springs are required, which are likewise expensive.

In the case of mounts for greatly curved lenses (globular lenses) working with springs is particularly difficult since the curvature of the glass mount exerts a disadvantageous moment on the mount.

The object of the invention is to provide a device for the above-mentioned type with which the glass mount can be retained on the worktable in a timesaving manner after it has been shifted with respect to the marking on the table and which is furthermore inexpensive and simple in its design.

For the solution of this problem the invention provides a device of the above-mentioned type which is characterized by a workable of magnetizable material and by loose magnet blocks provided with surfaces pressing the glass mount against the table.

In itself it is generally known in the industry to produce detachable joints by means of magnets.

In the present case the application of a simple magnet does not bring a satisfactory result, however, where the glass mount is held sufficiently on the worktable. Of decisive importance are the lateral surfaces pressing the glass mount against the table, by which the feelers of the apparatus for the production of the templet can slide along the inside of the mount into which the chamfer of the lens is inserted.

Preferably the magnet blocks consist of round pins with laterally projecting extensions with surfaces bearing on the glass mount. The surface pressing the glass mount against the table can also be formed by a recess in the magnet blocks.

In a preferred embodiment the laterally projecting lugs are designed as helical extensions. If the contact surfaces are formed by a recess, the upper wall of the recess is helical. Due to this helical design of the bulge or of the upper recess wall, the curvature of the glass mount is taken into consideration.

By simply turning the blocks, designed as round pins, about their longitudinal axis, different sections of the helical extensions or upper recess wall become active depending on the distance of the glass mount from the worktable at the point where the round magnet blocks are applied.

The underside of the extensions or the upper recess wall can form with the circumferential surface of the round block an angle other than 90°.

The two ends of the helical extensions or of the upper recess wall are spaced from each other, that is, the ends of the spiral bulge or of the upper recess wall are superposed in a lateral distance.

In the practical realization, a part of the block can consist of a magnetizable material, while the remaining part is formed of plastic etc.; preferably the block consists of a round magnetic disk on which the upper part of plastic with the helical extensions or the lugs is glued.

Embodiments of the device according to the invention are represented in the drawing where the block is provided with an extension.

Figure 2:
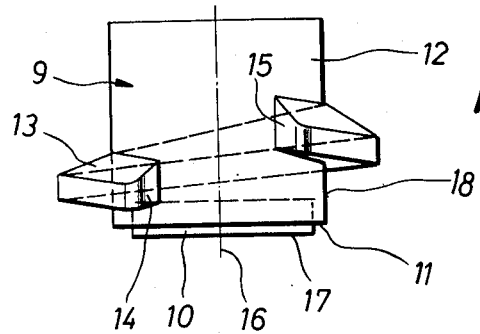
Figure 3:
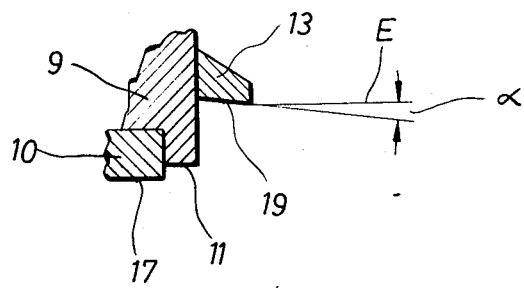
Figure 4:
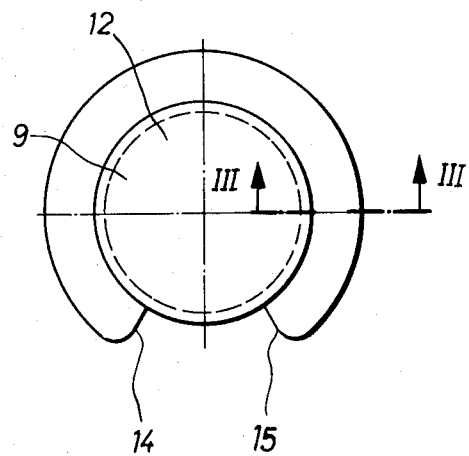
Figure 5:
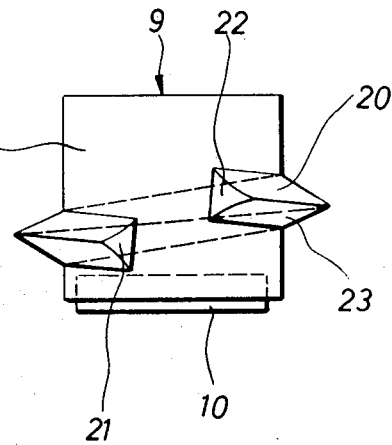

FIG. 1 is a top view of a part of a glass mount on a worktable
FIG. 2, 3 and 4 show one of the embodiments and
FIG. 5 shows another embodiment of the retaining block used.

The glass mount 1 with its opening 2 rests on the worktable 3 which consists of a thin, magnetizable plate in which is provided a circular opening 4 under which is arranged the marking device 5 provided with the rectangles, mostly a disk or plate. This marking device serves to center or decenter the mount in the direction of the arrow S as well as perpendicularly thereto.

On the worktable is provided a retaining bar 6 which is preferably adjustable in the direction of the arrow 7.

When the glass mount 1 has reached the desired position, it is necessary to lock it on the table so that, after the marking device 5 is removed, a feeler can protrude through the opening 4 which slides along the inner edge 8 of the opening 2 on which the chamfer of the lens will bear later.

As a means for retaining the glass mount on the table there are positioned several magnet blocks 9 which have the form of a cylindrical pin. The bottom part of this cylindrical pin receives a magnetic disk 10 which can be flush with the bottom 11 of the upper part 12 or slightly project over this bottom.

The upper part 12 is made preferably of plastic and carries in its lower section a helical extension 13 whose two ends 14, 15 are spaced from each other.

The helical pitch of the extension 13 is so selected that when a extension section is applied on the glass mount 1, as it is indicated in FIG. 1 by the blocks 9 represented in broken lines, the mount is retained in its end position. The block with a helical extension is turned to this end during its application about its longitudinal axis 16 so that the section of the extension 13 bears on the glass mount which has the corresponding distance from the surface of the table 3. Since the block is displaceable, on the one hand, on the basis of its smooth underside 17 of its magnetic part 10, (if necessary the block can also be provided with a slight corrugation which permits its displacement but prevents the block from being pushed away easily), and also on the basis of the rotation of the block about its longitudinal axis, a displaceable screw is obtained as a fastening means for the glass mount.

The underside of the metal disk 10 can be provided with concentric annular elevations which are of advantage insofar as they permit an easy rotation of the block about its longitudinal axis, while accidental lateral displacement of the block is not possible. The blocks can therefore be made to bear with their edge 18 on the outside of the mount, then they can be lowered in the direction of the longitudinal axis 16 until the magnetic disk 10 bears on the table, and then the blocks can be turned about the longitudinal axis 16.

The underside 19 of the bulge 13 can form an angle OC with the plane E of the table or a parallel thereto.

In the embodiment according to FIG. 5 an extension 20 has been selected which is likewise a helix and whose ends 21, 22 are superposed in a lateral distance. The cross section of this extension 20 is triangular, for example, the bottom surface 23 of the extension having an outwardly and upwardly directed slope.

The underside of the extension 13 of the blocks can be selected corresponding to given conditions. Deviations from the surface form represented here are possible and within the spirit of the invention.

I claim:

1. A device for detachably fastening articles on a work plane comprising; a base of magnetic material such as soft iron, a plurality of plastic blocks having a cylindrical shape each with a bar magnet secured in its lower end for slidable engagement with the base surface, said blocks formed with a helical extension which is integral with the cylindrical surface and which engages said articles.

2. A device in accordance with claim 1 wherein a retaining bar is secured to said base for providing a reference barrier which confines the article in one direction.

3. A device in accordance with claim 1 wherein said helical extension has a lower surface, the radial lines of which make an angle of less than 90° with the longitudinal axis of the cylindrical block.

4. A device in accordance with claim 1 wherein said blocks are made of nonmagnetic material except for a permanent bar magnet secured to the bottom of the block.

5. A device in accordance with claim 4 wherein said permanent magnets have a length that is less than the diameter of the blocks.

* * * * *